United States Patent
Yu

(10) Patent No.: US 7,975,490 B2
(45) Date of Patent: Jul. 12, 2011

(54) METHOD AND SYSTEMS FOR OPERATING A COMBINED CYCLE POWER PLANT

(75) Inventor: Ping Yu, Shanghai (CN)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 12/180,935

(22) Filed: Jul. 28, 2008

(65) Prior Publication Data

US 2010/0019496 A1    Jan. 28, 2010

(51) Int. Cl.
*F02C 9/00* (2006.01)
(52) U.S. Cl. .......................................... 60/795; 60/39.12
(58) Field of Classification Search ................. 60/39.12, 60/780, 781, 783, 785, 794, 795, 801
See application file for complete search history.

(56) References Cited

U.S. PATENT DOCUMENTS

| | | | |
|---|---|---|---|
| 4,119,861 A | 10/1978 | Gocho | |
| 4,403,292 A | 9/1983 | Ejzak et al. | |
| 4,442,665 A * | 4/1984 | Fick et al. ..................... | 60/39.12 |
| 4,870,338 A | 9/1989 | Abbondanti | |
| 4,967,096 A | 10/1990 | Diemer et al. | |
| 5,559,421 A | 9/1996 | Miyakawa | |
| 5,609,041 A * | 3/1997 | Rathbone et al. ............... | 62/646 |
| 5,783,932 A | 7/1998 | Namba et al. | |
| 6,333,622 B1 | 12/2001 | Fogarty et al. | |
| 6,504,261 B2 | 1/2003 | Fogarty et al. | |
| 6,568,207 B1 * | 5/2003 | Brugerolle et al. ............. | 62/643 |
| 6,866,092 B1 | 3/2005 | Molivadas | |
| 6,960,900 B2 | 11/2005 | Fogarty et al. | |
| 7,173,399 B2 | 2/2007 | Sihler et al. | |
| 7,805,923 B2 * | 10/2010 | Yoshida ..................... | 60/39.464 |
| 2001/0054823 A1 | 12/2001 | Fogarty et al. | |
| 2005/0116689 A1 | 6/2005 | Fogarty et al. | |
| 2006/0232250 A1 | 10/2006 | Sihler et al. | |
| 2006/0283206 A1 | 12/2006 | Rasmussen et al. | |

* cited by examiner

*Primary Examiner* — Louis Casaregola
*Assistant Examiner* — Phutthiwat Wongwian
(74) *Attorney, Agent, or Firm* — Armstrong Teasdale LLP

(57) ABSTRACT

A method and system for operating a gas turbine engine power system are provided. The system includes a gas turbine engine system that includes a gas turbine engine coupled to an electrical generator through a first shaft wherein the gas turbine engine includes a compressor, a combustion chamber, and a turbine drivingly coupled to the compressor and the electrical generator. The system also includes a variable speed electrical motor coupled to a load through a second shaft and a variable speed drive selectably couplable to the electrical generator during a starting sequence of the gas turbine engine system in a first configuration of the gas turbine engine power system and to the variable speed motor in a second configuration of the gas turbine engine power system.

22 Claims, 3 Drawing Sheets

METHOD AND SYSTEMS FOR OPERATING A COMBINED CYCLE POWER PLANT

BACKGROUND OF THE INVENTION

This invention relates generally to power generation systems and, more particularly, to combined cycle power plants that include large variable speed process equipment.

At least some known integrated gasification combined cycle power plants use an air separation unit to generate a flow of oxidant for the gasification process. For proper operation the air separation unit requires a source of relatively constant flow and pressure compressed air. A motor driven compressor is typically used for providing the compressed air at the necessary flow and pressure. However, the motor driven compressor is an expensive piece of equipment that uses significant electrical power. A gas turbine engine compressor is another source of compressed air. However, the air flow and pressure supplied by the gas turbine engine compressor is variable based on a load on the generator.

BRIEF DESCRIPTION OF THE INVENTION

In one embodiment, a system for operating a gas turbine engine power system includes a gas turbine engine system that includes a gas turbine engine coupled to an electrical generator through a first shaft wherein the gas turbine engine includes a compressor, a combustion chamber, and a turbine drivingly coupled to the compressor and the electrical generator. The system also includes a variable speed driving machine such as but not limited to a turbine drive or an electrical motor coupled to a load through a second shaft. The system further includes a variable speed drive system selectably couplable to the variable speed driving machine during a starting sequence of the gas turbine engine system in a first configuration of the gas turbine engine power system and to the variable speed driving machine in a second configuration of the gas turbine engine power system.

In another embodiment, a method of operating an engine generator system includes electrically coupling an output of a variable speed drive to the engine generator, starting the engine using the variable speed drive to motor the engine generator to a predetermined rotational speed, and switching the output of the variable speed drive from the engine generator when the engine has started to a load such that starting and variable speed operation of the load is controlled using the variable speed drive.

In yet another embodiment, an integrated gasification combined cycle (IGCC) power system includes a gas turbine engine generator system including a compressor, and a generator drivingly coupled to a gas turbine. The system also includes a variable speed booster coupled in flow communication between the compressor and an air separation unit wherein the variable speed booster is configured to receive a flow of compressed air at a variable flow and pressure and to generate a flow of compressed air at a substantially constant flow and a substantially constant pressure to the air separation unit. The variable speed booster is drivingly coupled to a variable speed driving motor. The system also includes a variable speed drive couplable to the generator during starting of the gas turbine engine generator system and to the variable speed driving motor when the gas turbine engine generator system is not being started.

BRIEF DESCRIPTION OF THE DRAWINGS

FIG. 1 is a schematic diagram of an exemplary integrated gasification combined-cycle (IGCC) power generation system;

FIG. 2 is a schematic block diagram of a portion of the system shown in Figure in accordance with an exemplary embodiment of the present invention; and FIG. 3 is a flow diagram of an exemplary method of operating an engine generator system.

DETAILED DESCRIPTION OF THE INVENTION

The following detailed description illustrates embodiments of the invention by way of example and not by way of limitation. It is contemplated that the invention has general application to operating variable speed machines including electrically powered equipment in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
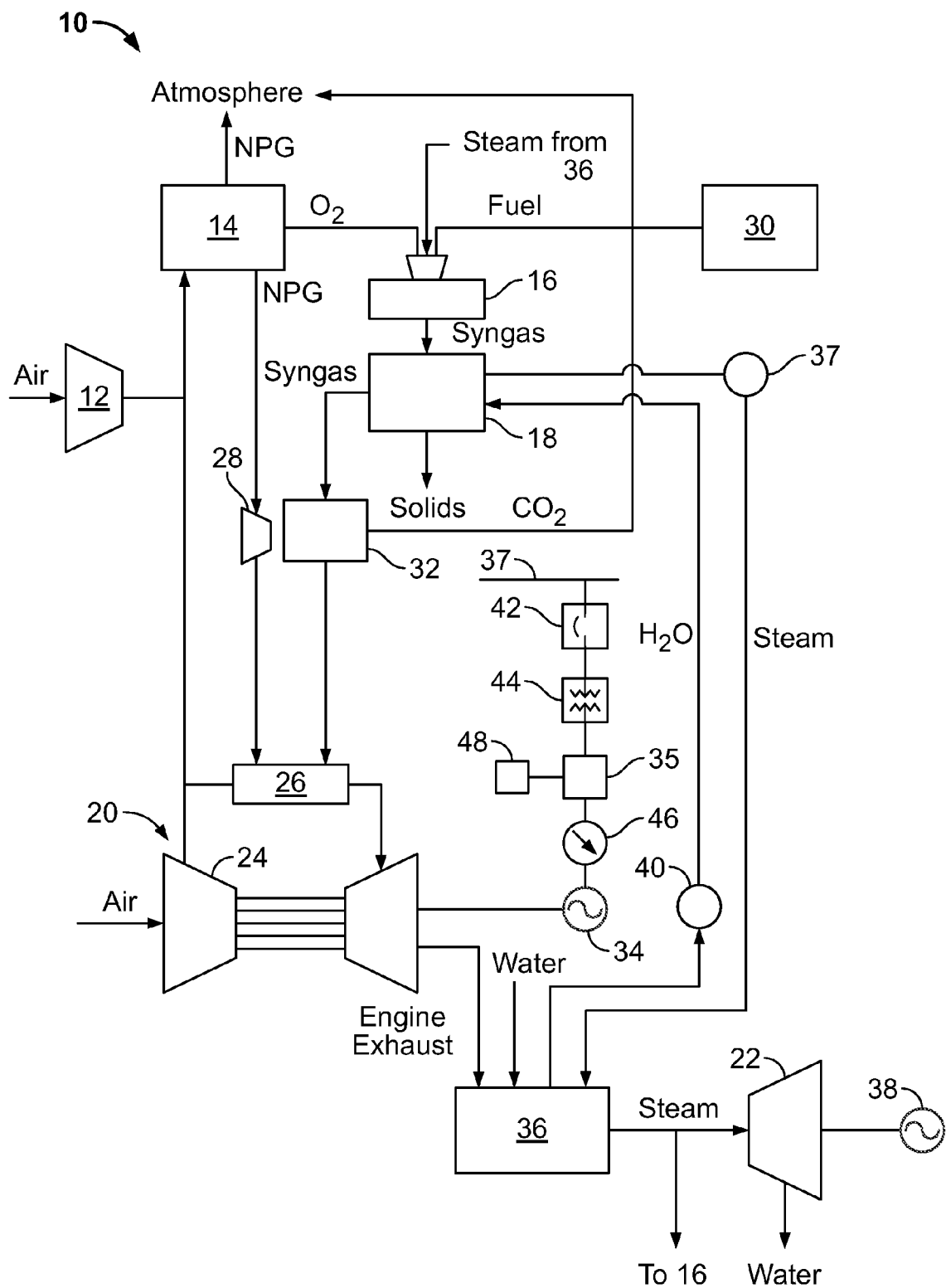
FIGS. 1-3 show exemplary embodiments of the method and systems described herein.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18. In various embodiments, gasifier 16 and syngas cooler 18 are combined into a single integral vessel.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas." The $O_2$ flow is channeled to gasifier 16 for use in generating partially combusted gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide. Gasifier 16 may be a fixed-bed gasifier, a fluidized-bed gasifier, and/or a fully entrained gasifier.

In the exemplary embodiment, syngas generated by gasifier 16 is channeled to syngas cooler 18 to facilitate cooling the syngas, as described in more detail below. The cooled syngas is channeled from syngas cooler 18 to a clean-up device 32 for cleaning the syngas before it is channeled to gas turbine engine combustor 26 for combustion thereof. Carbon dioxide ($CO_2$) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

When starting gas turbine engine 20, a starter 35 such as a load-commutated inverter (LCI) or static-frequency converter (SFC) receives an AC electrical power from a power system bus 37, in the exemplary embodiment, via a circuit breaker 42 and a power transformer 44. Starter 35 rectifies the AC power to DC power, then inverts the DC power into AC power having a variable AC frequency to supply to generator 34 via disconnect switch 46. Generator 34 is operated as a synchronous motor to provide a torque control necessary for gas turbine engine 20 to start. When gas turbine engine 20 attains a self-sustaining speed that it can maintain on its own combustion energy, disconnect switch 46 is opened to isolate starter 35 from generator 34. Circuit breaker 42 is also opened to cut off power supply from power system bus 37. A starter controller 48 receives various sensing and command signals, which it processes to regulate the operation of generator 34 when generator 34 is operated as a motor during startup of gas turbine engine 20. Starter 35 provides for adjustable speed operation and soft starting of generator 34. Soft starting reduces the mechanical stress on generator 34 and gas turbine engine 20 and facilitates eliminating electrical starting surges on AC power system 37. An output transformer permits starter 35 to operate with any voltage machine.

Furthermore, in the exemplary embodiment, system 10 includes a pump 40 that supplies boiled water from steam generator 36 to syngas cooler 18 to facilitate cooling the syngas channeled from gasifier 16. The boiled water is channeled through syngas cooler 18 wherein the water is converted to steam. The steam from syngas cooler 18 is then returned to steam generator 36 for use within gasifier 16, syngas cooler 18, and/or steam turbine 22.

Figure 2:
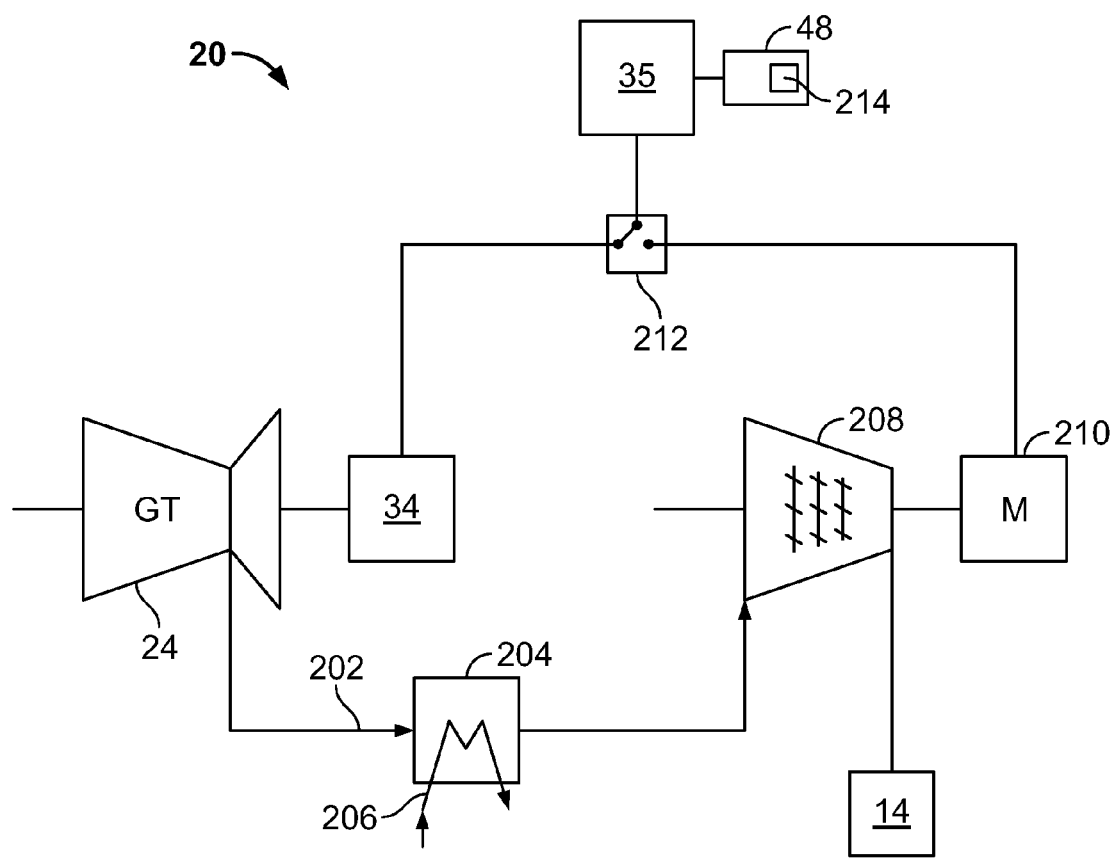

FIG. 2 is a schematic block diagram of a portion of system 10 in accordance with an exemplary embodiment of the present invention. In the exemplary embodiment, compressed air from gas turbine engine compressor 24 is supplied to ASU 14 through an intercooler 204 and a for example, a variable guide vane booster 208. Specifically, in the exemplary embodiment, high temperature compressed air is channeled from gas turbine engine compressor 24 through a first flow path 202 of an intercooler 204. A flow of cooling fluid flows through a second flow path 206 through intercooler 204. ASU 14 uses the compressed air to generate oxygen for use by gasifier 16. More specifically, ASU 14 separates the compressed air into separate flows of oxygen ($O_2$) and a gas by-product, sometimes referred to as a "process gas." ASU 14 to facilitate increasing the overall efficiency of system 10, the compressed air supplied to ASU 14 is bleed from gas turbine engine compressor 24 and is maintained at a relatively constant pressure using variable guide vane booster 208.

During operation, gas turbine engine compressor 24 supplies compressed air to combustor 26 and ASU 14. The pressure of the compressor bleed airflow discharged from gas turbine engine compressor 24 is variable and is related to the load on generator 34. Instead of channeling the variable pressure compressor bleed airflow directly to ASU 14, variable guide vane booster 208 is used to regulate an inlet pressure to ASU 14 by modulating the speed of variable guide vane booster 208 using starter 35 and adjusting airflow to ASU 14 with the changing speed using a set of variable guide vanes on variable guide vane booster 208 such that the airflow supplied to ASU 14 is at a substantially constant pressure over a wide range of operating loads of gas turbine engine 20.

To regulate the pressure of the airflow directed to ASU 14, variable guide vane booster 208 rotates at a variable speed to maintain a substantially constant outlet pressure. To modulate airflow of the compressed air flowing from gas turbine engine compressor 24 to ASU 14, variable guide vane booster 208 positions guide vanes to accommodate fluctuations in the flow due to the change in rotating speed and per airflow requirements of ASU 14. The operation of variable guide vane booster 208 permits wide fluctuations in compressor bleed air flow and/or pressure due to changes in the load on gas turbine engine 20 while maintaining a substantially constant air pressure with a required amount of airflow at the inlet of ASU 14.

In the exemplary embodiment, variable guide vane booster 208 is powered by a variable speed electric motor 210. After being used to startup gas turbine engine 20, starter 35 is removed from service and in prior art power systems, would be left in a standby state until the next startup of gas turbine engine 20. However, in various embodiments of the present invention, starter 35 is switched to provide variable speed power to variable guide vane booster 208 during operation of system 10 after gas turbine engine 20 is started. For example, a switch 212 may selectably connect the output of starter 35 to generator 34 or to variable guide vane booster 208. In an alternative embodiment, switch 212 may comprise for example, but not limited to two or more circuit breakers couplable to a variable speed power bus. In the exemplary embodiment, controller 48 includes a processor 214 and is configured to receive commands to control the operation of starter 35 in conjunction with generator 34 or to variable guide vane booster 208.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 214, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
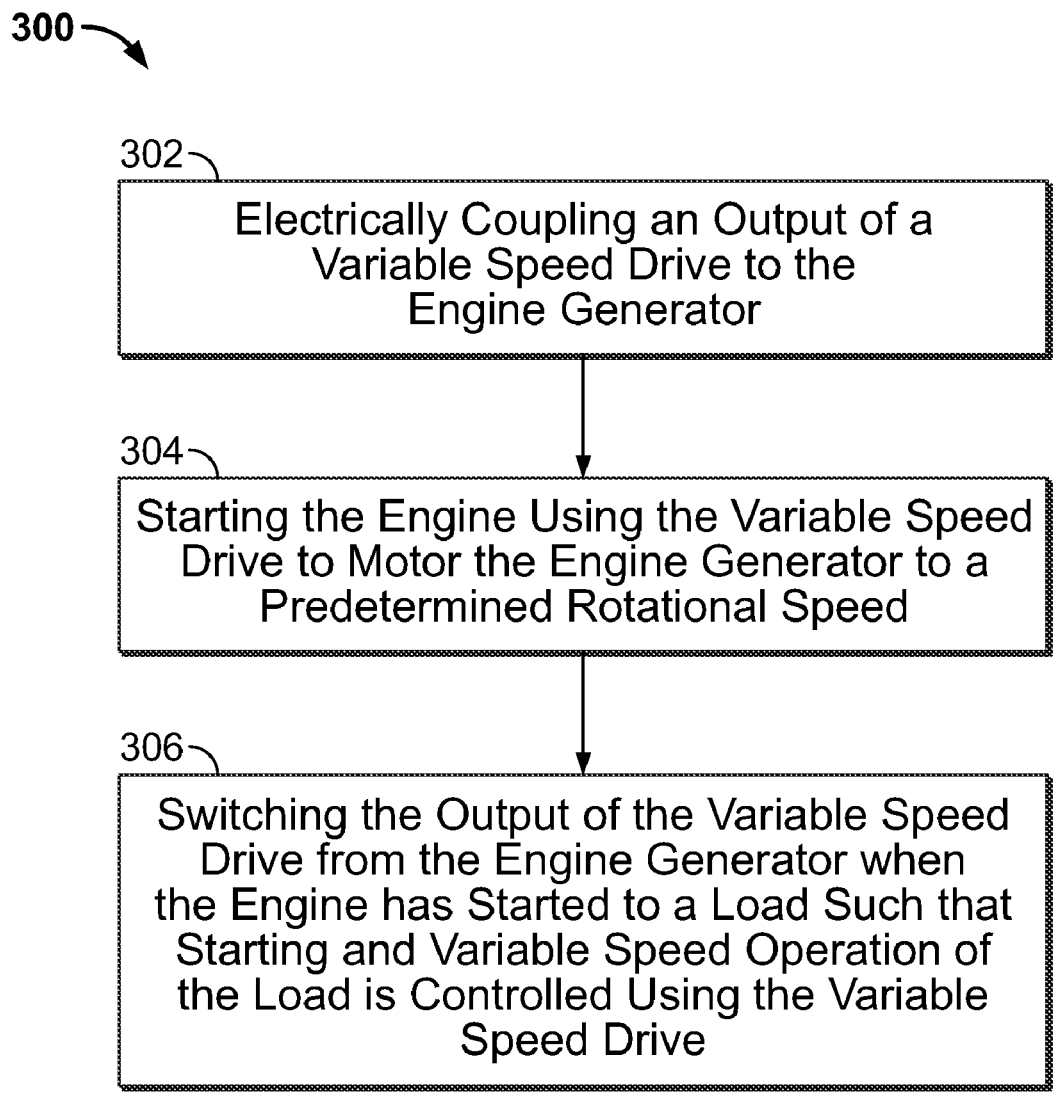

FIG. 3 is a flow diagram of an exemplary method 300 of operating an engine generator system. In the exemplary embodiment, method 300 includes electrically coupling 302 an output of a variable speed drive to the engine generator, starting 304 the engine using the variable speed drive to motor the engine generator to a predetermined rotational speed, and switching 306 the output of the variable speed drive from the engine generator when the engine has started to a load such that starting and variable speed operation of the load is controlled using the variable speed drive.

As will be appreciated based on the foregoing specification, the above-described embodiments of the disclosure may be implemented using computer programming or engineering techniques including computer software, firmware, hardware or any combination or subset thereof, wherein the technical effect is controlling a variable speed drive that is couplable to a plurality of different types of variable speed loads such as but not limited to generators operating as motors and synchronous and non-synchronous motor drives. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems of operating a combined cycle power plant provides a cost-effective and reliable means for providing an adjustable flow and a substantially constant pressure to an air separation unit. More specifically, the method and systems described herein facilitate using variable flow and pressure compressor bleed air supply the air separation unit. In addition, the above-described method and systems permits the use of a relatively inexpensive booster to adjust the compressor flow and even pressure variations of the gas turbine engine compressor rather than having to supply the air separation unit with an adjustable flow and a substantially constant pressure from a relatively more costly separate motor driven compressor. As a result, the method and systems described herein facilitate operating the power plant in a cost-effective and reliable manner.

Exemplary method and systems for operating a combined cycle power plant are described above in detail. The systems illustrated are not limited to the specific embodiments described herein, but rather, components of each may be utilized independently and separately from other components described herein. Each system component can also be used in combination with other system components.

While the disclosure has been described in terms of various specific embodiments, it will be recognized that the disclosure can be practiced with modification within the spirit and scope of the claims.

What is claimed is:

1. A gas turbine engine power system comprising:
a gas turbine engine system comprising a gas turbine engine coupled to an electrical generator through a first shaft, said gas turbine engine comprises a compressor, a combustion chamber, and a turbine drivingly coupled to said compressor and said electrical generator;
a source of bleed air from said compressor coupled in flow communication with an inlet of a variable speed booster; and
an air separation unit coupled in flow communication with an outlet of said variable speed booster, said variable speed booster coupled to a variable speed drive motor through a second shaft, wherein the variable speed booster is a single air supply source to the air separation unit.

2. A system in accordance with claim 1, further comprising a variable speed drive selectably couplable to said electrical generator during a starting sequence of said gas turbine engine system in a first configuration of said gas turbine engine power system and to a variable speed electrical motor in a second configuration of said gas turbine engine power system.

3. A system in accordance with claim 2, wherein said variable speed drive comprises an electric power frequency converter.

4. A system in accordance with claim 2, wherein said variable speed drive comprises a at least one of a load commutated inverter (LCI) and a static starting equipment (SSE).

5. A system in accordance with claim 1, wherein said variable speed booster comprises one or more rows of variable guide vanes configured to modulate a flow through said variable speed booster.

6. A system in accordance with claim 1, wherein said variable speed booster comprises at least one of an axial booster and a centrifugal booster.

7. A system in accordance with claim 1, further comprising a compressed air supply system configured to deliver a flow of compressed air at a substantially constant pressure to an air separation unit, said compressed air supply system comprises a source of bleed air from said compressor, an intercooler, and a variable speed booster coupled in series flow communication.

8. A system in accordance with claim 1, wherein said variable speed drive motor is drivingly coupled to said variable speed booster, said booster further configured to deliver a flow of compressed air at a substantially constant pressure to the air separation unit using the variable speed motor to control a rotational speed of the variable speed booster.

9. A system in accordance with claim 2, wherein said variable speed drive comprises a load commutated inverter.

10. A system in accordance with claim 1, wherein said variable speed drive motor comprises a synchronous motor.

11. A method of operating an engine generator system that includes a compressor configured to supply a flow of compressed air to an air separation unit, said method comprising:
electrically coupling an output of a variable speed drive to an engine generator;
starting the engine using the variable speed drive to motor the engine generator to a predetermined rotational speed;
switching the output of the variable speed drive from the engine generator when the engine has started to a variable speed booster compressor such that starting and variable speed operation of the variable speed booster compressor is controlled using the variable speed drive; and
maintaining a flow of compressed air that matches demand at a substantially constant pressure to an air separation unit coupled in flow communication with the compressor using the variable speed booster compressor, wherein the variable speed booster is a single air supply source to the air separation unit.

12. A method in accordance with claim 11, wherein coupling an output of a variable speed drive to the engine generator comprises coupling an output of a load-commutated inverter to the engine generator.

13. A method in accordance with claim 11, wherein starting the engine using the variable speed drive comprises soft starting the engine by driving the engine generator as a synchronous motor.

14. A method in accordance with claim 11, wherein starting the engine comprises starting the engine using a load-commutated inverter.

15. A method in accordance with claim 11, wherein switching the output of the variable speed drive from the engine generator when the engine has started to a variable speed booster compressor comprises switching the output of the variable speed drive to a synchronous motor drivingly coupled to a variable speed booster compressor.

16. An integrated gasification combined cycle (IGCC) power system comprising:
   a gas turbine engine generator system comprising a compressor, and a generator drivingly coupled to a gas turbine,
   a variable speed booster coupled in flow communication between the compressor and an air separation unit, said variable speed booster configured to receive a flow of compressed air at a variable flow and pressure from the compressor and to generate a flow of compressed air at a flow that matches demand using one or more variable vanes and a substantially constant pressure to supply to said air separation unit, said variable speed booster drivingly coupled to a variable speed driving motor; and
   a variable speed drive couplable to said generator during starting of said gas turbine engine generator system and to said variable speed driving motor when the gas turbine engine generator system is not being started, wherein the variable speed booster is a single air supply source to the air separation unit.

17. An IGCC power system in accordance with claim 16, further comprising a gasification vessel configured to receive a flow of fuel and a flow of an oxidant, said gasification vessel configured to partially oxidize said flow of fuel using said flow of oxidant to generate a synthetic gas.

18. An IGCC power system in accordance with claim 16, wherein said variable speed driving motor comprises a synchronous motor.

19. An IGCC power system in accordance with claim 16, wherein said variable speed drive comprises a controller including a processor programmed to soft start said gas turbine engine generator system and disconnect said variable speed drive when said gas turbine engine generator system attains a predetermined rotational speed.

20. An IGCC power system in accordance with claim 16, wherein said variable speed drive comprises a controller including a processor programmed to:
   receive signals relating to operating parameters of at least one of said gas turbine engine generator system and said variable speed booster; and
   transmit command signals to said variable speed drive such that said variable speed booster is controlled to provide a flow that matches a demand of said air separation unit and a substantially constant pressure to said air separation unit.

21. An IGCC power system in accordance with claim 20, wherein said variable speed drive comprises a controller including a processor further programmed to transmit command signals to said gas turbine engine generator system such that said gas turbine engine generator system is controlled to provide a soft start of said generator operating as a synchronous motor.

22. An IGCC power system in accordance with claim 16, further comprising an intercooler coupled in flow communication between said compressor and said variable speed booster, said intercooler configured to reduce a temperature of the flow of compressed air from the compressor.

* * * * *